US007550177B2

(12) United States Patent
White et al.

(10) Patent No.: US 7,550,177 B2
(45) Date of Patent: Jun. 23, 2009

(54) POLYSULFIDE GENERATION USING A MANGANESE DIOXIDE CATALYST ASSEMBLY AND METHOD OF MAKING THE ASSEMBLY

(76) Inventors: Paul H. White, 1903 Shoreline Dr., St. Charles, IL (US) 60174; George I. Butler, 8303 Laurel Leaf La., Humble, TX (US) 77346

( * ) Notice: Subject to any disclaimer, the term of this patent is extended or adjusted under 35 U.S.C. 154(b) by 683 days.

(21) Appl. No.: 10/999,388

(22) Filed: Nov. 30, 2004

(65) Prior Publication Data
US 2005/0153832 A1 Jul. 14, 2005

Related U.S. Application Data

(60) Provisional application No. 60/553,005, filed on Mar. 12, 2004, provisional application No. 60/535,753, filed on Jan. 12, 2004.

(51) Int. Cl.
*B05D 1/12* (2006.01)
*B05D 3/12* (2006.01)
(52) U.S. Cl. .................. 427/205; 427/202; 427/369
(58) Field of Classification Search ............. None
See application file for complete search history.

(56) References Cited

U.S. PATENT DOCUMENTS

| 5,124,177 | A | * | 6/1992 | Kasmark et al. | 427/202 |
|---|---|---|---|---|---|
| 5,446,003 | A | * | 8/1995 | Augustine et al. | 502/159 |
| 5,792,513 | A | * | 8/1998 | Koslow et al. | 427/195 |
| 6,540,843 | B1 | | 4/2003 | Liu et al. | |
| 2001/0008717 | A1 | * | 7/2001 | Iijima | 428/702 |

FOREIGN PATENT DOCUMENTS

WO WO 2004/038092 A2 5/2004

* cited by examiner

*Primary Examiner*—Frederick J Parker
(74) *Attorney, Agent, or Firm*—Wood, Phillips, Katz, Clark & Mortimer

(57) ABSTRACT

A catalyst assembly for use in polysulfide generation in white liquor employed in a pulp or paper making process includes a substrate for supporting a catalytic material, at least the surface of which is formed of a corrosion resistant thermoplastic or thermosetting resin, and granular manganese dioxide particles partially embedded in the surface to be mechanically bonded thereto, a catalytically effect percentage of the surface area of the particles being exposed and free of the resin. Also disclosed is a reactor for utilizing such a catalysis assembly and a method of making the catalysis assembly.

12 Claims, 5 Drawing Sheets

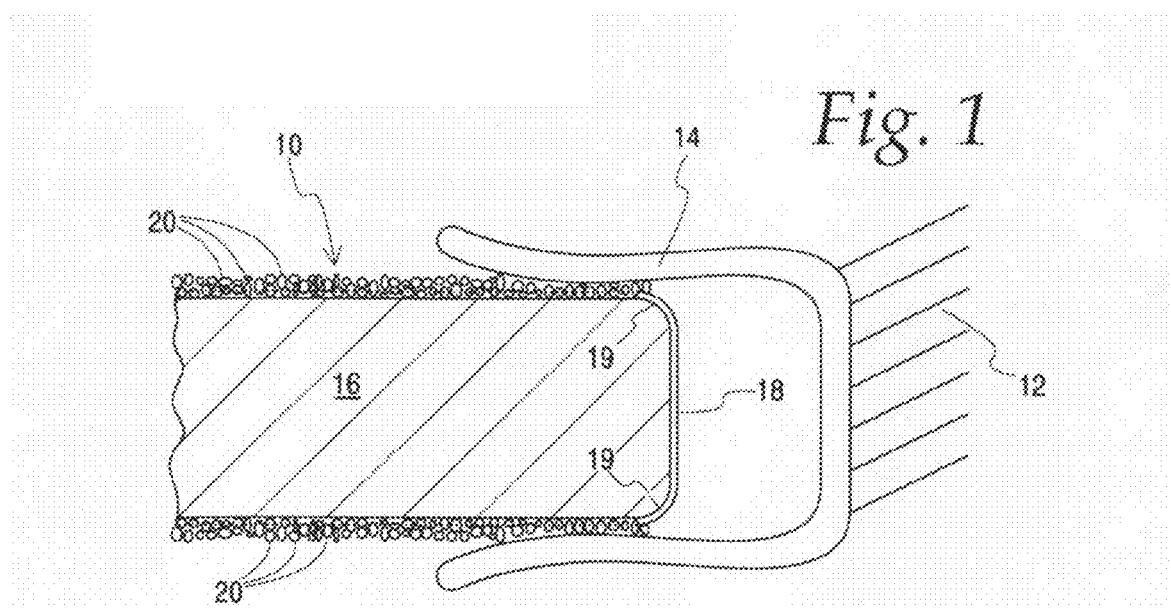
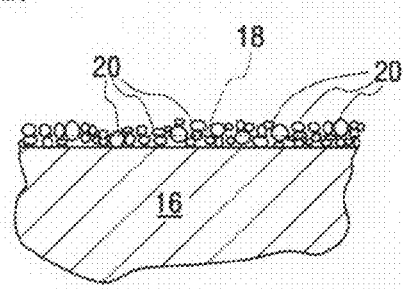
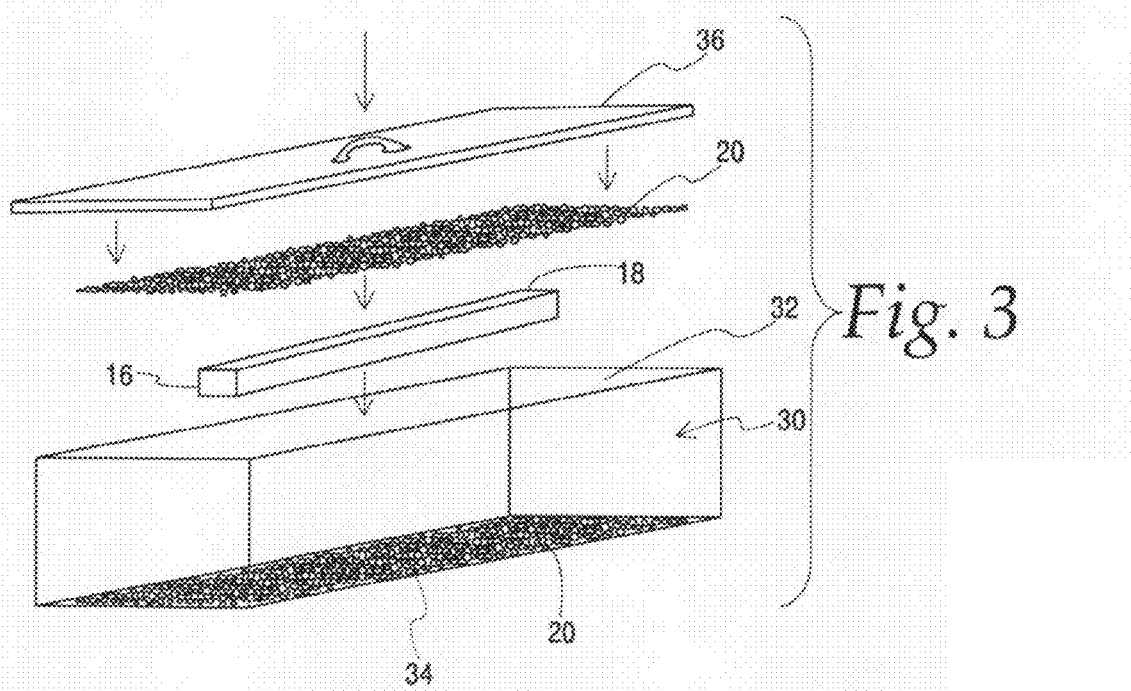

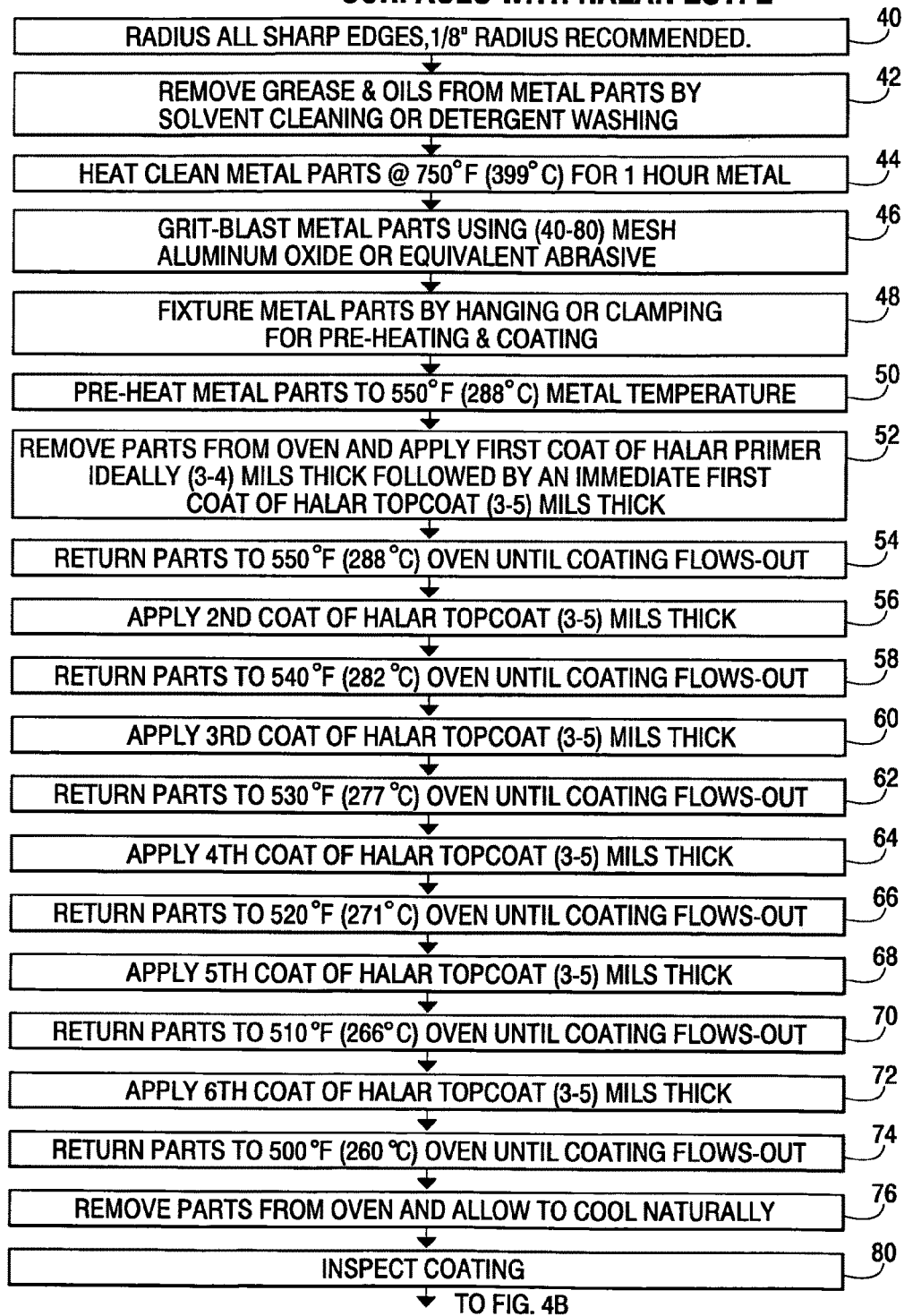
Fig. 4A PROCESS FLOW CHART FOR COATING METAL SURFACES WITH HALAR ECTFE

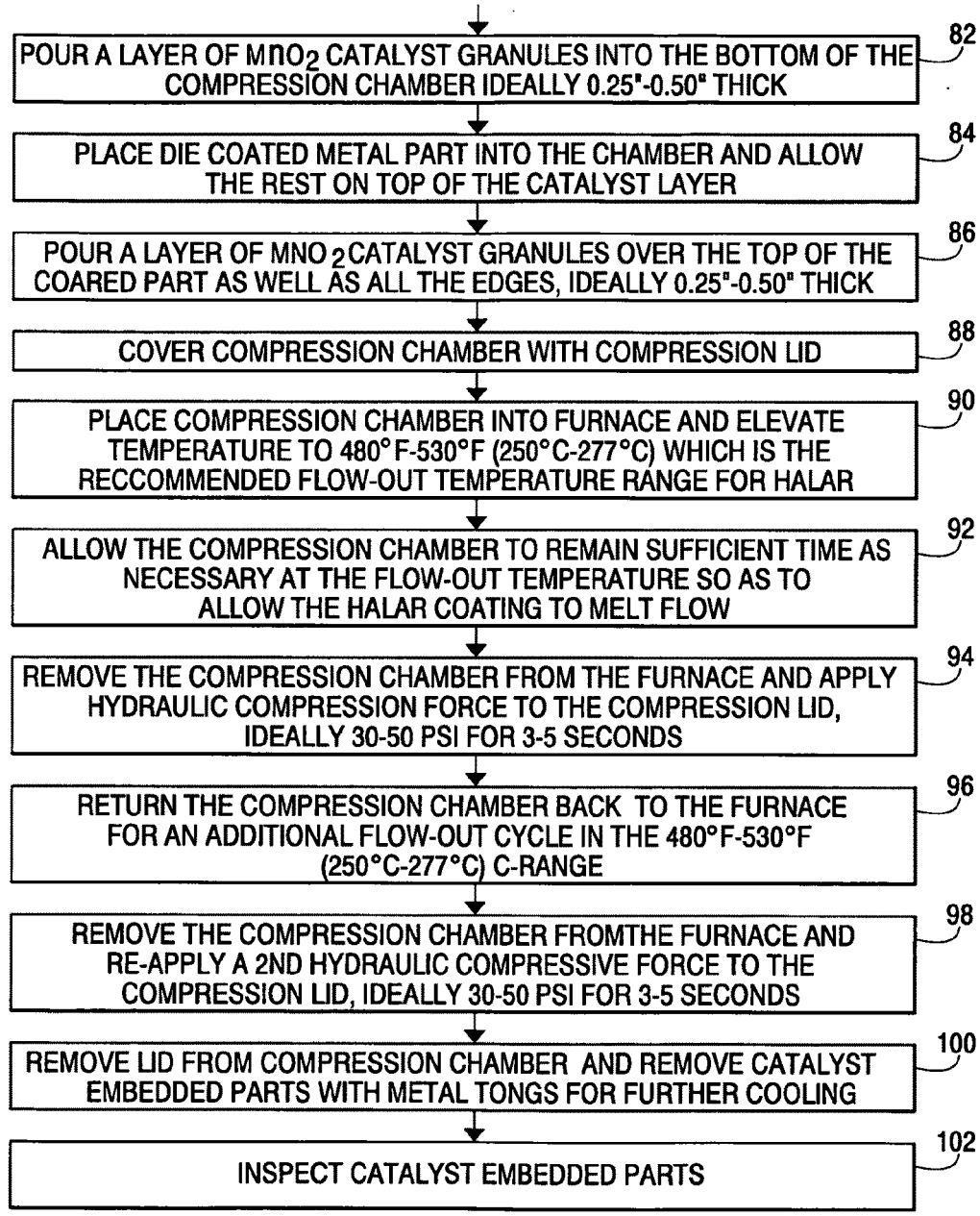

POLYSULFIDE GENERATION USING A MANGANESE DIOXIDE CATALYST ASSEMBLY AND METHOD OF MAKING THE ASSEMBLY

CROSS REFERENCE

This application claims priority of the provisional application of Paul H. White and George I. Butler, Ser. No. 60/553,005, filed Mar. 12, 2004, entitled "Polysulfide Generation Using a Manganese Dioxide Catalyst Assembly and Method of Making the Assembly, and of the provisional application of George I. Butler, Ser. No. 60/535,753, filed Jan. 12, 2004, entitled "Method for Preparing a Catalyst Layer Over a Metallic Surface by the Use of a Coating."

FIELD OF THE INVENTION

This invention relates to pulp and paper making processes, and more specifically, to the generation of polysulfide in such processes using manganese dioxide as a catalyst.

BACKGROUND OF THE INVENTION

Those well versed in the pulp and paper making industry are well acquainted with the term "white liquor". It is long been known that pulp yield in the pulp and paper manufacturing processing may be increased substantially by forming polysulfide in the white liquor. Many attempts have successfully been made to take advantage of the yield improvement of polysulfide. However, in the course of these developments, problems have been encountered with the introduction of manganese dioxide into the white liquor to the point that although yield improvements have been obtained, the return on investment has been insufficient to justify the cost of ridding the process of problems caused by the presence of manganese dioxide.

In a typical process, a slurry combination of manganese dioxide and calcium carbonate, usually referred to as sludge, is combined with the white liquor. The manganese dioxide reacts with sodium sulfide in the mixed liquor to cause the formation of polysulfide and a yield improvement results.

However, if too much manganese dioxide is injected into the white liquor stream, it may pass through the entire system and create black specks in the resulting paper which appear as color contaminates, making the paper unsuitable for many uses. As a consequence the color contaminated paper cannot fetch as high a price on the market as it would without the contamination so the yield savings are lost as a result of the price reduction.

It has been determined that filtration could be used to remove excess manganese dioxide. However, the filters required are expensive. Further, filtration would necessarily require that the calcium carbonate be filtered out prior to the filtration to recapture the manganese dioxide. In short, two filters would have to be employed and the capital expense of the equipment for the system is considerably increased, negating the benefit of the yield advantage provided by polysulfide to the point where a favorable return on investment cannot be obtained.

The present invention is directed to overcoming one or more of the above problems.

SUMMARY OF THE INVENTION

It is the principal object of the invention to provide a new and improved means whereby polysulfide generation in white liquor in pulp and paper processes can be advantageously achieved to increase yield without resulting in color contamination of the paper produced and with minimal capital expenditure. More particularly, it is an object of the invention to provide a new and improved manganese dioxide catalyst assembly that may be placed in a reactor located in the white liquor stream of a pulp and paper manufacturing process at minimal cost and whose use does not require large capital expenditures. It is also an object of the invention to provide a reactor and catalyst construction and a method of making a catalyst assembly.

According to one facet of the invention, there is provided a catalyst assembly for use in polysulfide generation in white liquor employed in a paper making process. The assembly includes a substrate for supporting a catalyst material, at least the surface of which is formed of a corrosion resistant thermoplastic or thermosetting resin. Granular manganese dioxide particles are partially embedded in the surface to be mechanically bonded thereto such that at least a catalytically effective amount of the surface area of the particles is exposed and free of the resin.

The resulting assembly, or several of them, may be removably mounted in a reactor for the generation of polysulfide which includes a vessel of corrosion resistant material having at least one port for the ingress and/or egress of white liquor, allowing contact of the catalyst assemblies by white liquor of high pH at an elevated temperature.

In a preferred embodiment, a metal substrate is utilized and the resin applied as a coating to the metal substrate.

According to the invention, the material of which the substrate is formed is selected from the group consisting of carbon steel, stainless steel, aluminum, titanium, nickel, cobalt, chromium, and alloys thereof.

In a highly preferred embodiment, the body is a flattened body with rounded edges.

A preferred embodiment of the invention contemplates that the resin coating have a thickness in the range of about 10-30 mils and is selected from the group consisting of ethylene and chlorotrifluoroethylene copolymer, ethylene and tetrafluoroethylene copolymer, copolymers of fluorinated ethylene-propylene, tetrafluoro-ethylene and perfluorinated vinyl ether copolymer, per-fluoro-alkoxy polymer, polyaryletherketone, and epoxy.

In a highly preferred embodiment of the invention, the granules of manganese dioxide have a particle size of 6 mesh or smaller while even more preferably, the particle size is 20 mesh or smaller.

In a preferred embodiment, the invention contemplates that at least about 50% of the surface area of the granules is exposed and free from the resin coating. Even more preferably, 75% of the surface area of the granules is exposed and free from the resin coating.

The invention also contemplates a method of making a manganese dioxide catalyst assembly which includes the steps of:

a) providing a layer of a resin having high corrosion resistance and the ability to withstand elevated temperatures employed in the reactor in which the assembly is used, the resin being capable of being in a plastic state;

b) covering most or all the resin layer with manganese dioxide granules; and c) pressing the granules into the resin layer while in a plastic state so that the granules become mechanically bonded to the resin layer while allowing at least a catalytically effective amount or more of the surface area of the granules to remain exposed and free of the resin layer.

In a preferred embodiment of the invention, step a) above is performed by forming the layer as a coating on a flattened body, preferably a metal body.

In one embodiment, the resin is a thermoplastic resin placed in the plastic state by the application of heat and step c) above is followed by an additional step d) of cooling the resin layer with the granules embedded therein to mechanically bond the granules to the layers.

It is highly preferred that the resin be tolerant of highly caustic environments of a pH of 12 or more and capable of continuous elevated service at temperatures up to about at least 230° F.

Where the resin used is a thermosetting resin, step c) is followed by the step of curing the resin.

Other objects and advantages will become apparent from the following specification taken in connection with the accompanying drawings.

DESCRIPTION OF THE DRAWINGS

FIG. 1 is a fragmentary, sectional view of a catalyst assembly made accordingly to the invention removably mounted in a reactor;

FIG. 2 is an enlarged vertical section of part of the catalyst assembly;

FIG. 3 is a somewhat schematic, perspective view of a compression chamber that may be utilized in the fabrication of the catalyst assembly;

FIG. 4 is composed of FIGS. 4A and 4B that illustrates a flow chart for a preferred method of making a preferred embodiment of the catalyst assembly;

DESCRIPTION OF THE PREFERRED EMBODIMENTS

Figure 5:
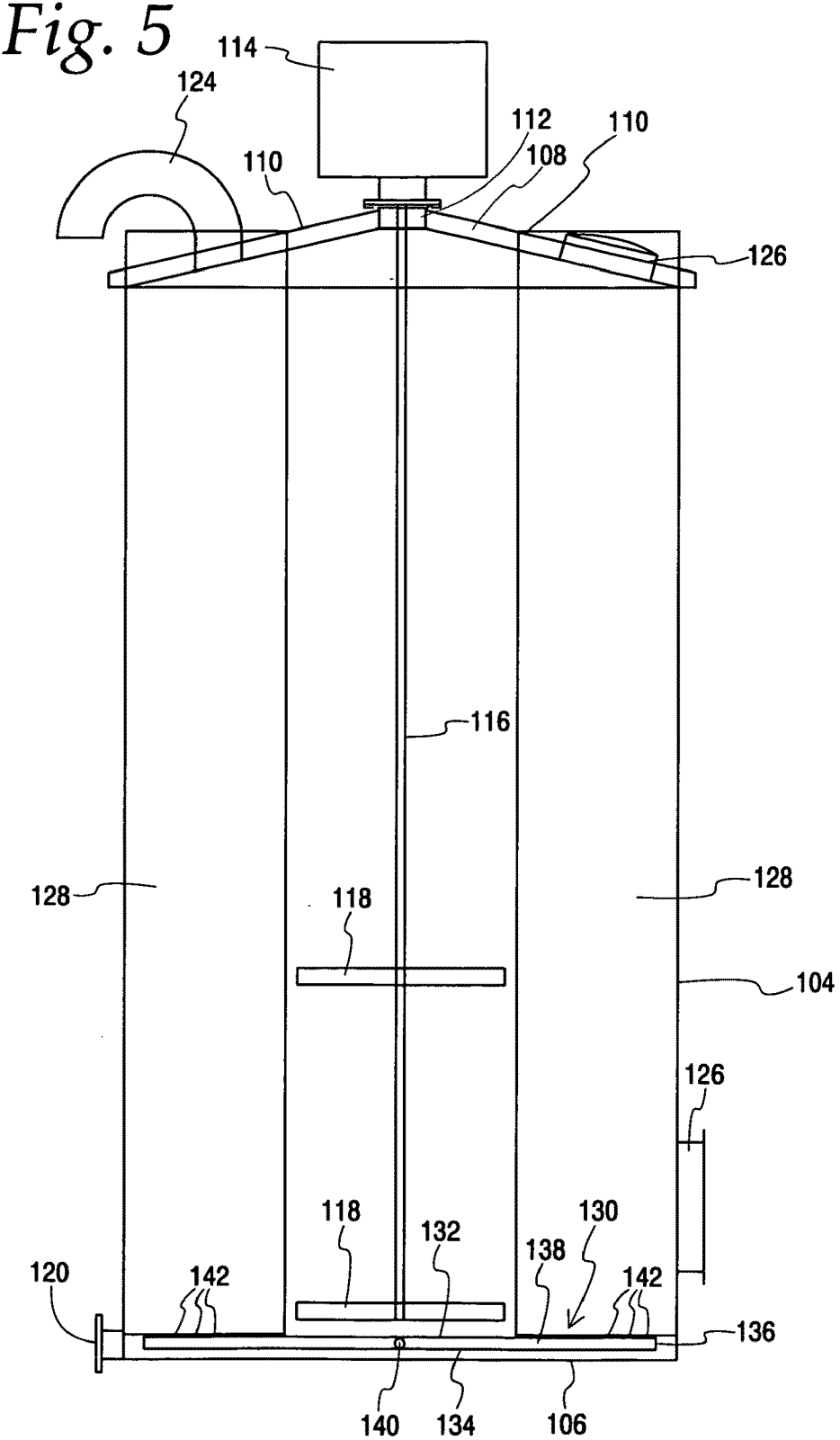
FIG. 5 is a somewhat schematic sectional view of a reactor with a plurality of the catalyst assemblies mounted therein.

An exemplary embodiment of the invention will now be described in connection with the accompanying drawings. As alluded to previously, the invention, in one facet, is a catalyst assembly that is intended to be employed in the generation of polysulfide in white liquor utilized in pulp and paper making processes to increase the pulp yield. Those knowledgeable in the art of pulp and paper making will readily appreciate that severe environmental operating conditions are common. Typically, the white liquor, at least at the time where polysulfide generation is occurring, is extremely caustic having a pH of 12 or more. Further, conventional operating temperatures are typically in the range of about 175° F.-230° F. Thus, the catalyst assembly of the invention is intended to provide a support for a manganese dioxide catalyst that prevents manganese dioxide granules used in the catalyst from entering the white liquor stream where they could result in color contamination of the resulting paper. It must also be capable of tolerating high concentrations of sodium hydroxide at pH's of 12 or above and continuous operating temperatures in the range of about 175° F.-230° F.

With the foregoing in mind, reference is made to FIG. 1 wherein a catalysis assembly made according to the invention, generally designated 10, is illustrated. The same is mounted in a reactor shown schematically at 12 by a spring clip or a U-shaped channel 14. Other mounting devices could be used as desired. However, it is highly preferred that the mounting device utilized be such as to removably mount the catalysis assembly 10 to allow the latter to be removed for service, cleaning, replacement or the like.

The catalyst assembly, according to a preferred embodiment of the invention, includes a substrate 16, a coating 18 on the substrate, and a plurality of manganese dioxide granules 20 partially embedded in the coating.

The substrate 16, in one embodiment, is an elongated, flattened bar of metal having a thickness on the on the order of approximately ½ of an inch. The substrate may be formed of a variety of materials including carbon steel, stainless steel, aluminum, titanium, nickel, cobalt, chromium, and alloys thereof. Of those, stainless steel is preferred in that it is less reactive under the process conditions encountered in polysulfide generation and even more specifically, 316 stainless steel is preferred.

It is particularly noted that edges or corners 19 of the substrate 16 are generously rounded. It is preferred that the rounded edges or corners 19 have a minimum radius of about ¼". This is so that when the coating 18 solidifies or cures, depending on whether it is thermoplastic or thermosetting, it will not thin at the corners 19 as would be the case if they were relatively sharp. Consequently, a uniformly thick coating 18 about the entire substrate is achieved, even at the corners 19.

For the best corrosion resistance, the entirety of the substrate 16 is provided with the coating even though, as seen in FIG. 1, that part of the coating 18 covering an end of the substrate when the same is a flattened bar, does not contain any manganese dioxide granules 20. The coating 18 should be tolerant of the highly caustic conditions encountered, pH 12 and above as mentioned previously, as well as being able to withstand continuous service temperatures in the afore-mentioned 175° F.-230° F. range. The coating must also be able to be applied sufficiently thick so as to allow the granules 20 to be partially embedded into the coating and securely mechanically bonded thereto. The coatings may either be thermoplastic or thermosetting with the former being preferred over the latter. Suitable coatings include Halar ECTFE which is understood to be a copolymer of ethylene and chlorotrifluoroethylene and Hyflon MFA understood to be a copolymer of tetrafluoroethylene and perfluorinated vinyl ether available from Solvay Solexis of Thorofare, N.J.; Tefzel ETFE, understood to be a copolymer of ethylene and tetrafluoroethylene, Teflon FEP, understood to be a copolymer of fluorinated ethylene-propylene, Teflon PFA, understood to be a perfluoro-alkoxy polymer manufactured by E.I. DuPont of Wilmington, Del. and distributed by Intech Services of Newark, Del.; Peek, understood to be a polyaryletherketone produced by Victrex PLC of Lancashire, United Kingdom and Heresite EB-6817 and EB-6917 epoxy-coatings manufactured by Heresite Protective Coatings, Inc. of Manitowac, Wis. All but the Heresite compositions are thermoplastic while the Heresite compositions are thermosetting.

Of the foregoing coatings, Halar ECTFE is preferred and the coating is produced using Halar primer 6714 with multiple coats of Halar top coat 6014. In some instances, the primer may be dispensed with. That is to say, use of the primer can be considered as optional.

The coating 18 may be applied to the substrate 16 by any of a variety of methods. For example, application of the coating 18 may include the use of fluidized beds, flocking guns, conventional spray guns, electrostatic powder coating equipment, and/or rotomolding/rotolining coating techniques. A coating thickness in the range of about 10-30 mils is preferred with an optimal thickness of about 20 mils.

The manganese dioxide granules 20 are of particle size of 6 mesh or smaller with a particle size of 20 mesh or smaller being preferred.

As mentioned previously, the granules are partially embedded in the coating 18 to be mechanically bonded to the substrate 16. Because the particles serve as a catalyst it is highly desirable that the exposed surface area of the granules 20 be maximized and for this reason, smaller mesh sizes are preferred.

The manganese dioxide can be any one of many that are commercially available. A typical product will include, for example, 4.3% Ferric oxide 3.1% aluminum oxide; 3.0% silicon dioxide; 2.0% barium oxide; 0.06% calcium oxide; 0.16% sodium with the balance being manganese dioxide and manganese, with the manganese dioxide being predominate between the two.

The granules 20 are partially embedded in the coating 18 as mentioned previously. Generally, speaking, the partial embedding of the granules 20 and the coating 18 is such at least a catalytically effective amount or percentage of the surface area of the manganese dioxide particles 20 is exposed and free of the coating 18. While the actual % (percent) of surface area exposed may vary dependent upon process parameters such as the degree of polysulfide generation desired, the tolerable amount of manganese dioxide allowed in the paper product, the amount of turbulence in the white liquor stream at the site of polysulfide generation etc, it is believed that at least about 50% of the surface area of the granules should be exposed and free of the coating. Even more preferably, it is believed that 75% of the surface area of the granules should be exposed and free from the coating.

According to the assembly process used, and to be described in greater detail hereinafter, it appears that 75% exposed surface area cannot be exceeded without introducing the possibility that the integrity of the mechanical bond between the granules 20 and the coating 18 will be compromised to the point that some granules over time may become detached from the substrate 16 and be present as free particles within the white liquor being processed and thereby introduce the possibility of color contamination in the final paper product. Quite obviously, however, the 75% figure can be exceeded when and if improved bonding techniques become available or some degree of manganese dioxide detachment can be tolerated.

It is to be particularly noted that the invention expressly contemplates that a substrate 16 of different composition than that of the coating 18 is not an essential element of the invention, although it is preferred. For example Halar ECTFE is available not only in powder form, but in solid form as sheets or bars; and the invention contemplates the use of such a material having the granules 20 partially embedded in the surface thereof. That is, it is contemplated that in some instances, a coating material such as Halar ECTFE may make up both the substrate 16 and the coating 18.

Turning now to FIG. 3, one form of an apparatus useful for partially embedding the granules 20 into the coating 18 is illustrated. The same includes a rectangular chamber, generally designated 30 having an open upper end 32 and a flat bottom 34. A layer of manganese dioxide granules 20 covers the bottom 34 to a depth of ¼" to ½".

With the unfinished catalyst assembly placed on the bottom layer of granules 20, an additional layer of manganese dioxide granules 20 is placed in the chamber 30 to cover the partially finished assembly, again to the depth of ¼" to ½".

A compression lid 36 that is sized to enter the chamber 30 through the open top 32 is applied to the upper layer of manganese dioxide granules. The chamber 30 and lid 36 are then placed in an oven to plasticize the coating as will be seen and the lid 36 subjected to pressure, typically in the range of about 30-50 psig. This pressurization causes the granules to enter the now plastic or flowable coating layer 18 on the substrate 16 to the desired degree. The granules 20 may or may not "bottom out" against the substrate 16, if used. The substrate 16 does, however, limit penetration of the granules 20 through the coating 18 and thus assists in ensuring that a catalytically effective percentage of the surface area is exposed and free of the coating 18.

Turning now to FIG. 4 which is made up of FIGS. 4A and 4B, detailed steps in a method of making the catalyst assembly according to the invention utilizing Halar primer and Halar top coat on a 316 stainless steel substrate utilizing manganese dioxide granules whose particle sizes are 6 mesh or smaller will be described.

After selecting and sizing the substrate, a first step, shown in block 40, is to radius the sharp edges of the substrate 16.

The step 40 is followed by a step shown in block 42 of degreasing the substrate by appropriate solvent cleaning or detergent washing.

If a metal substrate is utilized, it is then heat cleaned at an elevated temperature. This is shown at block 44 and is performed at 750° F. for a sufficient period of time that the metal substrate is at that temperature for one hour.

The next step is shown at block 46 and is the abrasion of the surfaces of the substrate by grit or shot blasting with aluminum oxide or silicon carbide or other equivalent particulate of a mesh of 40-80. Any residual dust from blasting and abrasion of the substrate should be removed with a stream of clean dry air. The abrasion step represented by block 46 is such that a so called "anchor profile" of 3-4 mils is established. That is to say, the surface of the substrate should be microscopically roughened to provide valleys and peaks where the bottom of the valleys is 3-4 mils below the tops of the peaks.

At this point, the substrate should be handled only by means of clean gloves or tongs and should be coated immediately. Oxide formation which could cause poor adhesion of the coating 18 on the substrate 20 is thereby avoided.

Preliminary to the coating process, the substrates are first fixtured by hanging or clamping for preheating prior to coating. This is illustrated by a block 48. The substrate is then preheated, as shown by a block 50, to 550° F. when employing the Halar primer/top coat coating system.

The initial step in the coating process is shown at block 52 and according to a preferred embodiment, electrostatic powder coating is a preferred coating means. One type of electrostatic powder coater is a model ITW Gema PGC-1 available from Gema Industrial Powder Systems of Indianapolis, Ind. In using this equipment, Halar primer powder is drawn from storage hopper and transported to the gun by compressed air. Individual particles of powder are electrostatically charged as they pass through the gun while the substrate 16 is grounded, producing an electrostatic field between the gun and the substrate 16. The powder particles are attracted to the field and cling to the substrate 16 until fused in an oven flow out step to be described. A primer coating thickness of 3-4 mils is obtained and then a 3-5 mil thick application of the top coat is immediately applied.

As the powder deposits on the substrate, the substrate becomes insulated and the loosely adhering powder film repels additional powder. The result is a very uniform film of the Halar resin.

With the Halar resin, the maximum coating thickness that can be achieved is typically 4-6 mils on a cold part. Preheating the part reduces the insulating effect of the powder, permitting the deposition of heavier coatings. By preheating the part above 465° F., the melting point of the resin, even heavier coatings of 20-30 mils have been obtained. This technique, since the substrate is above the melting point of the resin, is a form of flocking. Even heavier coats are possible by recoating the hard part from the flow out step followed by additional oven flow out for each recoating. Thus, upon the completion of the step shown at block 52, the part is returned to the oven at 550° F. until the coating flows out, that is, the coating becomes sufficiently flowable that the powder fuses into a uniform body. This is shown at block 54.

Following the initial flow out represented by block 54, a second coat of the top coat is applied. The coating should be 3-5 mils thick.

At block 58, the flow out step is repeated. It is to be noted, however, that the oven temperature is lowered 10° F., to 540° F. from 550° F.

Following the second flow out step, a third coat of top coat is applied is illustrated by a block 60. This coat is also 3-5 mils thick.

A further flow out step is illustrated at block 62 and again, the oven temperature is reduced 10° to 530° from the previous flow out step.

A fourth application of top coat at a 3-5 mils thickness is then applied as illustrated at block 64 followed by still another flow out step shown at block 66 where again, the oven temperature is reduced by 10° to 520° F.

Blocks 68, 70, 72, 74 represents two additional coating steps, each followed by a flow out step with each flow out step occurring at an oven temperature 10° F. less than the preceding flow out step.

At this point, the desired nominal thickness of 20 mils for the coating 18 has been basically achieved and the substrate 16 is removed from the oven and allowed to cool at room temperature as shown at block 76.

Following cooling, the coating is inspected as illustrated at block 80. This this involves inspecting the coating for appearance, uniformity, thickness and adhesion. Film thickness should fall within the above mentioned 10-30 mil range and preferably will nominally be 20 mils thick. Should further thickness be necessary, one or more additional coating steps followed by one or more flow out steps is performed. Each flow out step should be at a temperature reduced 10° F. from the previous step until 500° F. is reached. A Halar coating should not be processed below 500° F. The progressive reduction in temperature during the flow out step prevents resin sag and thermal degradation of the resin.

The inspection step shown at block 80 is then followed by the initiation of the embedding step, shown at a block 82 in FIG. 4B. The compression chamber (FIG. 3) has its bottom covered with a layer of manganese dioxide granules of the selected particle size to a depth of ¼" to ½" and then the coated substrate rested upon the top of the manganese dioxide layer. This is illustrated at block 84 in FIG. 4B.

Thereafter, a further layer of manganese dioxide granules is placed over the top of the coated part as well as all the edges and again, this layer is in the range ¼" to ½" thick in relation to the top of the substrate 16. This step is illustrated at block 86.

The compression lid 36 is then placed into the compression chamber 30 onto the upper layer of manganese dioxide granules as illustrated by the block 88.

The compression chamber is then placed in an oven or furnace and the temperature of the compression chamber and its contents is elevated to 480° F.-530° F. which is the recommended flow out temperature for Halar fluoropolymers. However, with automated equipment, where oven residence time is carefully controlled, temperatures as high as 575° F. have been successfully used. For manual operation, where the possibility of operator in-attention exists, the 480° F.-530° F. flow out temperature range should be used. The whole point is that the temperature should not be so high and the residence time so long as to give rise to thermal degradation of the resin. In all cases, the resin should be confined in the oven for only a sufficient period of time to fully fuse the coating. Anything longer than that at high temperatures increases the possibility of resin degradation and resin sag.

The heating of the compression chamber is illustrated at box 90. Residence time is somewhat schematically shown at 92 and the removal of the compression chamber from the furnace is illustrated at block 94. Upon removal of the compression chamber from the oven, a compression force, which may be done with a hydraulic press, is applied to the compression lid and ideally in the 30-50 psig range. It is maintained, preferably, for a time in the range of 3-5 seconds.

The compression chamber is then returned to the furnace as illustrated at block 96 which is essentially a repeat of the steps illustrated in blocks 90 and 92.

As shown at block 98, the compression chamber is again removed from the furnace and subjected to a compressive force on the compression lid of 30-50 psig for 3-5 seconds.

As shown at block 100, the lid 36 may then be removed from the compression chamber 30 and the catalyst assembly removed with metal tongs for cooling.

The catalyst assembly 10 is then inspected (block 102) for appearance and uniformity of catalyst covering and partial embedding into the coating. Deficiency in catalyst coverage may be corrected by repeating the steps indicated at blocks 82-98 if required.

Following inspection, the catalyst assembly 10 is washed using water, preferably at a nominal pressure of about 30 psig to remove any residual or loosely adhered catalyst granules 20 which are not securely anchored in the coating. The catalysis assembly may then be dried using dry compressed air and is now ready for installation in a reactor.

The foregoing is also described in the provisional applications of Butler, Ser. No. 60/535,753, filed Jan. 12, 2004, and White et al, Ser. No. 60/553,005, filed Mar. 12, 2004, the entire disclosures of which are herein incorporated by reference.

Figure 6:
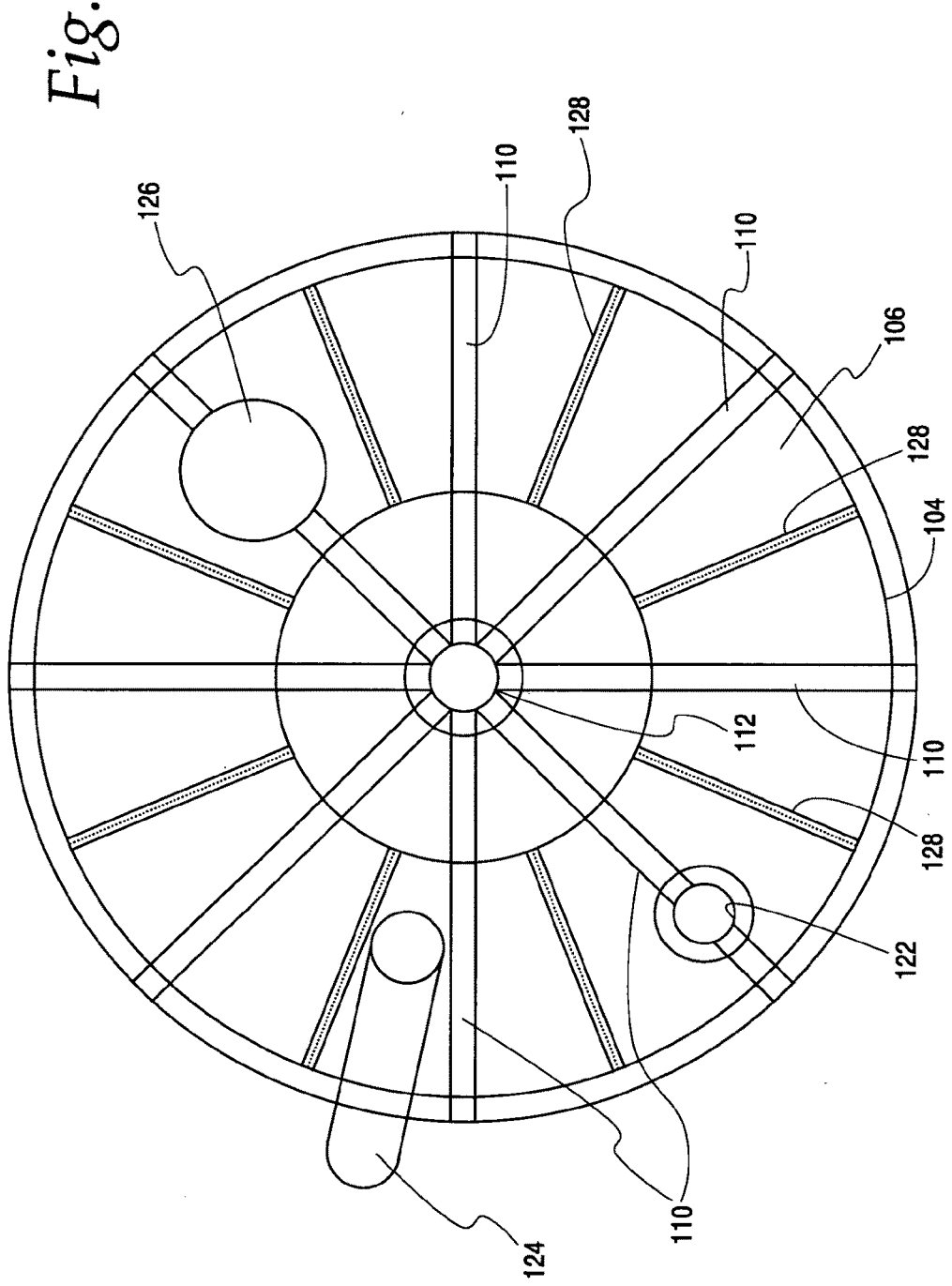
FIG. 6 is a plan view of the reactor.

FIGS. 5 and 6 illustrate, somewhat schematically, a reactor in which a plurality of the catalyst assemblies 10 may be removably mounted. The reactor includes a vertical, generally cylindrical wall 104 provided with a bottom wall 106 and a shallow, frusto-conical cover 108. The cover 108 includes a star like configuration of agitator support beams 110 which mount, at their common center 112, a motor 114. The motor 114 is connected to a downwardly directed, depending shaft 116 which extends into the vessel defined by the wall 104, bottom 106, and cover 108 and which is provided with agitator blades 118 along its length.

The wall 104, adjacent to the bottom 106, includes an outlet 120 and the cover 108 is provided with an inlet 122 as seen in FIG. 6.

If desired, a vent 124 may also be placed in the cover. Access openings 126, provided with removable covers not shown, provide a means for ingress and egress to the interior of the vessel for servicing purposes as for cleaning.

In the embodiment illustrated in FIGS. 5 and 6, between each of the agitator support beams 110, the catalyst assembly holders 128 are provided. In the illustrated embodiment, eight catalyst assembly holders 128 are provided and the cover 108 may be suitably hinged at the location of the catalyst holders 128 so as to allow them to be placed within the vessel or removed therefrom as the need arises. In the usual case, a frame provided with a lifting eye and carrying several of the assemblies 10 may be provided at each location illustrated.

The basic reactor is completed by an oxygen injector/distributor generally designated 130. The injector/distributor 130 can take on any of a plurality of forms. Its purpose is to inject gaseous oxygen into the reactor and distribute it about the bottom thereof so it may bubble to the top and regenerate the manganese dioxide catalyst as is well known. In FIG. 5 one form of distributor/injector is made up of top and bottom circular plates 132 and 134 joined by a peripheral wall 136 to define an oxygen manifold space 138.

An oxygen inlet 140 is connected to a suitably controlled source of gaseous oxygen to fill the manifold space 138. The top plate 132 is provided with plural perforations 142 through which the gaseous oxygen is distributed and released within the reactor.

The reactor thus illustrated can be utilized as a batch reactor or as a continuous flow reactor. In either case, mechanical agitation promotes uniformity of the polysulfide generating reaction.

What is claimed is:

1. A method of making a manganese dioxide catalyst assembly for use in a reactor employed in paper making to cause generation of polysulfide in white liquor, comprising the steps of:
   a) providing a layer of a resin tolerant of environments whose pH is 12 or more and having the ability to withstand temperatures at least up to about 230° F., the resin capable of being in a plastic state;
   b) covering most or all of the resin layer with manganese dioxide particles; and
   c) pressing the particles into the resin layer while in a plastic state so that the particles become mechanically bonded to the resin layer while allowing at least a catalytically effective percentage of the surface area of the particles to remain exposed and free of the resin layer to form said manganese dioxide catalyst assembly.

2. The method of claim 1 wherein step a) is performed by forming the layer as a coating on a flattened body.

3. The method of claim 2 wherein the body is formed of metal.

4. The method of claim 1 wherein said resin is a thermoplastic resin and is placed in said plastic state by the application of heat; and step c) is followed by d) cooling the resin layer with the particles imbedded therein to mechanically bond the particle to the layer.

5. The method of claim 4 wherein the body is formed of stainless steel, the particles have a particle size of 20 mesh or smaller and the resin is a copolymer of ethylene and chlorotrifluoroethylene.

6. The method of claim 1 wherein said resin is tolerant of highly caustic environments of a pH of 12 or more and capable of continuous elevated service temperatures in the range of about 176-230° F.

7. The method of claim 1 wherein said percentage is at least 50%.

8. A method of making a manganese dioxide catalyst assembly for use in a reactor employed in paper making to cause generation of polysulfide in white liquor, comprising the steps of:
   a) providing a layer of a resin capable of being in a flowable state and that is tolerant of environments whose pH is 12 or more and which is capable of continuous service at elevated temperatures at least up to about 230° F.;
   b) covering the surface of the resin layer with manganese dioxide particles having a particle size of 6 mesh or smaller;
   c) pressing the particles into the surface of the resin layer to partially embed the particles therein such that at least about 50% of the surface area of the particles is exposed and free of the resin; and
   d) causing the resin layer to harden to thereby mechanically bond the particles to the resin layer to form said manganese dioxide catalyst assembly.

9. The method of claim 8 wherein step a) is performed by forming a coating having a thickness in range of about 10-30 mils on a flattened substrate.

10. The method of claim 8 wherein the resin is thermoplastic and step d) is performed by cooling the resin.

11. The method of claim 8 wherein the resin is thermosetting and step d) is performed by curing the resin.

12. The method of claim 8 wherein about 70% of the surface area of the particles is exposed and free of resin.

* * * * *